United States Patent Office 2,758,666
Patented Aug. 14, 1956

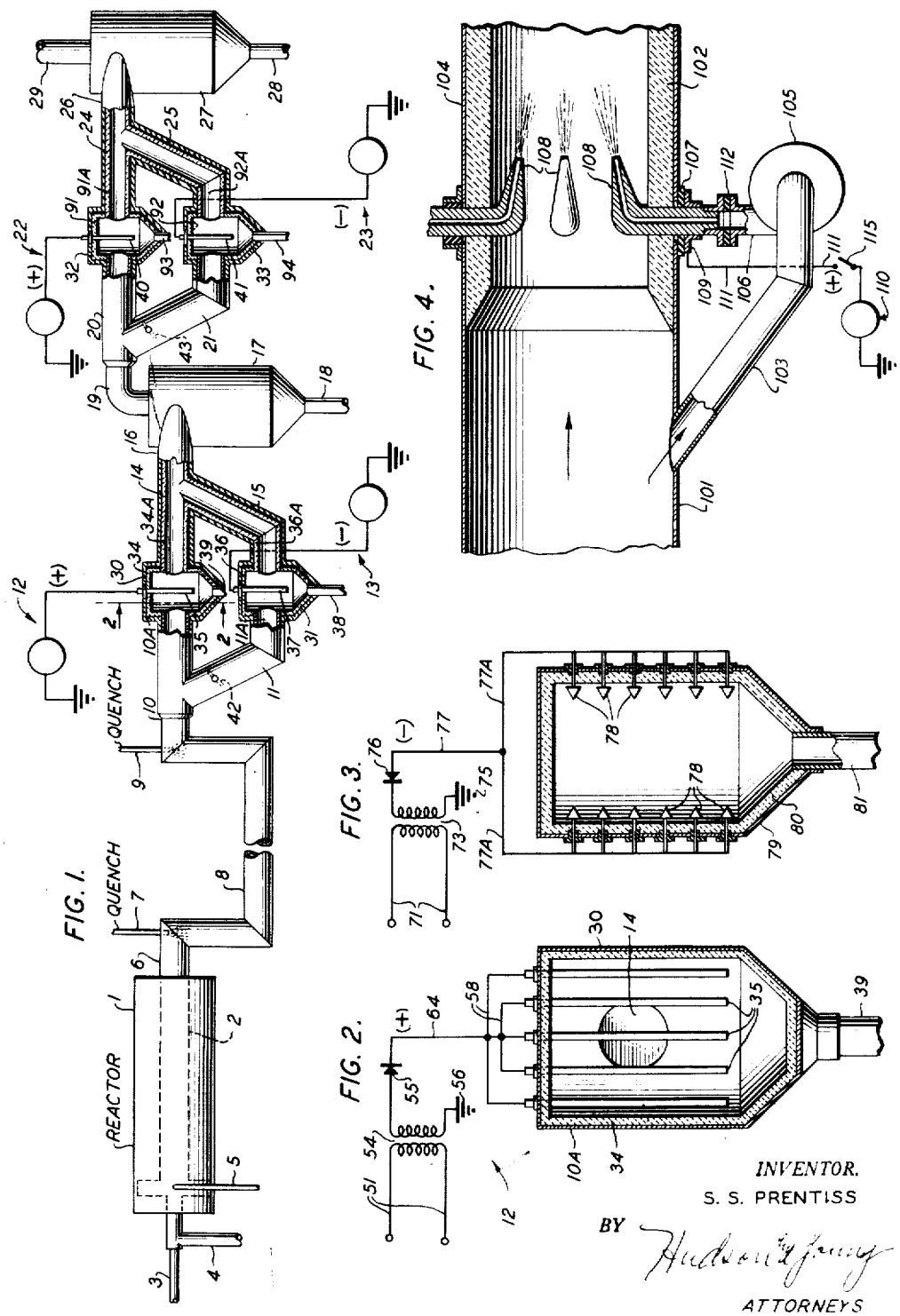

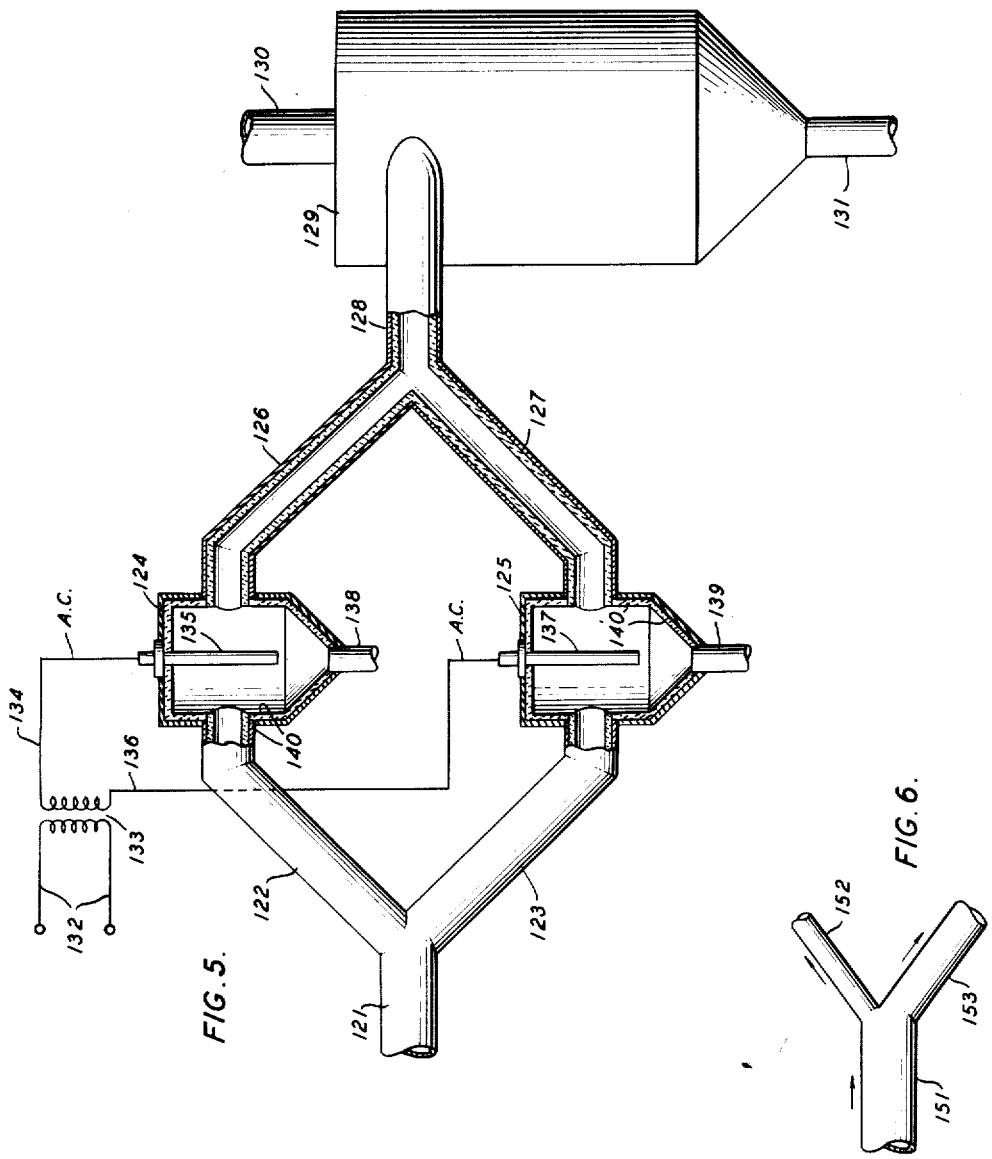

2,758,666

CARBON BLACK SEPARATION

Spencer S. Prentiss, Bartlesville, Okla., assignor to Phillips Petroleum Company, a corporation of Delaware Application April 10, 1952, Serial No. 281,516

11 Claims. (Cl. 183—7)

This invention relates to a process and apparatus for the separation and recovery of carbon black. In one aspect it relates to an apparatus and process for the separation and recovery of carbon black from the effluent of a carbon black production furnace.

As now practiced in the manufacture of carbon black from hydrocarbons by furnace processes, the effluent from the furnace or reactor is passed to a spray tower and then through an electrostatic precipitator. In such a precipitator the carbon black particles are given one electrostatic charge by one series of electrodes and are deposited on the electrodes of opposite charge. The deposited black is knocked off or falls off the electrodes and is caught in a hopper. The stream is then passed to one or more cyclone separators for removal of the black not previously recovered. While usually well over 90 per cent of the black is recovered losses are still appreciable.

One object of my invention is to devise a method for recovering carbon black from the gaseous effluent of carbon black production furnaces.

Another object of my invention is to devise a method for recovering carbon black in high yield from the gaseous effluents of carbon black production furnaces.

Still another object of my invention is to provide a process which is adaptable to treating large volumes of carbon black production furnace effluents for the recovery of carbon black at a minimum of cost.

Yet another object of my invention is to devise an apparatus for carrying out such a process which apparatus is relatively simple and inexpensive to construct and to operate.

I achieve these and other objects by dividing a gas stream containing carbon black in suspension into two portions, imparting to the carbon black in one portion an electrostatic charge, and to the carbon black in the other portion a charge of the opposite sign. The two charged streams are then mixed and the combined stream is passed to one or more cyclone separators in which the carbon black is separated from the gas stream. As another embodiment of my invention, a high voltage alternating current of low frequency is used to impart charges to a stream of continuously flowing carbon black. According to this latter embodiment when using a low frequency high voltage alternating current, such as 15 or 20 cycles per second, one portion of a stream of carbon black is given a negative charge while the next following portion of the stream of carbon black is given a positive charge. In passing from the charging electrodes to a cyclone separator, the positively charged carbon black particles have ample time to become mixed with the negatively charged particles. During this mixing since charges of unlike signs attract, carbon black particles become coagulated into agglomerates which are much easier to separate from their suspending gases than are the unagglomerated carbon black particles as produced. In still another embodiment, one stream of carbon black may be passed through a conduit of insulating material at a high velocity whereby the carbon black particles acquire a static charge, usually positive, the so-charged stream is introduced into an uncharged stream and the combined stream passed to a cyclone separator.

In the drawing Figure 1 illustrates diagrammatically one form of apparatus in which to carry out the process of my invention. Figure 2 is a sectional view taken on the line 2—2 of Figure 1. Figure 3 is an elevational view, partly in section, of another form of apparatus which can be used in carrying out my invention. Figure 4 illustrates another embodiment of apparatus, partly in section, for carrying out my invention. Figure 5 illustrates an embodiment of apparatus for utilizing alternating current for carrying out the process of my invention. Figure 6 illustrates an apparatus part for use in place of a portion of the apparatus of Figure 1.

Referring to the drawing and specifically to Figure 1, reference numeral 1 identifies a carbon black production furnace such as would be satisfactory for producing carbon black for agglomeration according to my invention. Such a carbon black furnace and methods of operation are described in U. S. Patent 2,564,700. Reference numeral 2 refers to the reaction zone. A hydrocarbon charge stock is passed through a line 3 into the reaction zone and at the inlet end thereof air is introduced from line 4 to prevent carbon deposition on the furnace end of the charge inlet 3. Air for combustion of a portion of the charge hydrocarbon or a combustible mixture of air and hydrocarbon for supplying heat for conversion of hydrocarbon to carbon black is introduced tangentially into the reactor through a line 5. The tangential injection of air or air and gas at a high velocity gives a helical motion to the contents of the reactor and further produces by centrifugal force a protective layer or blanket of hot gases adjacent the furnace walls so that the walls will be free from carbon deposits at all times. The carbon black particles formed in reactor 1 pass as a gaseous suspension through pipe 6 which contains a quench, such as a water spray 7, which is adapted to cool the furnace effluents from a reaction temperature usually higher than 2200° F. to a temperature sufficiently low to arrest further reaction, for example, about 1000° F. An air cooling zone 8, which comprises an extended length of bare pipe, is provided for further cooling of the quenched effluent by the atmosphere to a temperature within the range of 400° to 600° F. A second quench 9 may be employed if desired.

Another type of furnace useful in producing another type of carbon black is described in U. S. 2,375,795, by Joseph C. Krejci. These and other types of carbon black producing processes and apparatus can be employed to produce carbon black which can be separated and recovered from its suspending gases according to this invention.

According to my invention I provide vessel 30 with conduits 10 and 14 attached thereto, and vessel 31 with attached conduits 11 and 15. Vessel 30 and conduit 14 are lined with an electrically insulating material 34 and 34A, respectively, preferably a heat resisting ceramic material. In like manner vessel 31 is provided with a ceramic liner 36 and conduit 15 with a ceramic liner 36A. While these liners may be chosen from among such materials commercially available, they are usually of the same material. Conduit 11 branches from conduit 10 and conduit 15 connects with conduit 14 as shown. Vessel 30 is provided with some electrodes 35 which are insulated, electrically, from a steel shell 10A by the insulating liner 34. An apparatus assembly 12 furnishes high voltage direct current for charging the electrodes 35 electrostatically. In like manner, electrodes 37 are assembled in vessel 31 out of electrical contact with the metal shell 11A of this vessel. An apparatus assembly 13 provides an electrostatic charge for electrodes 37 of sign opposite that provided electrodes 35.

The end of conduit 16 opposite vessel 30 is connected to a cyclone type separator 17 in a conventional manner. A conduit 19 leads from the top center of separator 17 to conduits 20 and 21 and thence to a pair of vessels 32 and 33, equipped similarly to vessels 30 and 31. Conduits 24 and 25 lead respectively from vessels 32 and 33, and conduit 25 connects with conduits 24 which is further connected by a conduit 26 to a second cyclone separator 27. A pipe 29 may lead to a stack or may discharge directly to the atmosphere or may even lead to a third set of chambers similar to chambers 30, 31 and 32 and 33.

The vessels 32 and 33 are provided with ceramic liners 91 and 92, respectively, while conduits 24 and 25 have ceramic liners 91A and 92A, respectively.

The electrical apparatus assembly 12 of Figure 1 is illustrated therein diagrammatically, for purposes of simplicity. This apparatus, however, is shown in section and on a larger scale in Figure 2. In Figure 2 the steel walls 10A of vessel 30 are lined with a ceramic insulating material 34. Extending through the top of the vessel are a plurality of electrodes 35 which terminate short of the bottom of this vessel. The top ends of these electrodes are connected by leads 58 to a common lead 64 which in turn is connected to a rectifier 55. Rectifier 55 in turn is connected with one terminal of the secondary of a transformer 54. The other terminal of the secondary is grounded at 56. The primary connections 51 of this transformer are connected to a source of alternating current, not shown. The rectifier 55 as illustrated, is intended to pass electricity to impart a positive electrostatic charge to the electrodes 35. The transformer 54 may be any desired type of transformer suitable to transform alternating current to a voltage of from 5000 to 100,000 volts, or higher.

In Figure 2 the lower end of the vessel 30 is hopper shaped and terminates at pipe 39.

The electrical apparatus assembly 13 for charging electrodes 37 in vessel 31 is similar in all respects to the electrical apparatus assembly 12 with the exception that it is adapted to impart a negative electrostatic charge to electrodes 37.

Apparatus 22 is intended to impart a positive electrostatic charge to electrodes 40 in vessel 32 while apparatus 23 charges electrodes 41 negatively.

According to my invention a stream of carbon black furnace effluent gases containing suspended carbon black, properly cooled by quench 7, atmospheric cooler 8 and quench 9, if necessary, is divided into two streams, one passing via conduit 10 into vessel 30 and the other passing via conduit 11 into vessel 31. In vessel 30 a positive electrostatic charge is imparted to the carbon black particles while in vessel 31 a negative electrostatic charge is imparted to the carbon black therein. These vessels and conduits leading therefrom are well insulated electrically so as to promote efficient charging of the carbon black. The oppositely charged streams are flowed together at the point of juncture of conduit 15 with conduit 14. At this point since unlike charges attract one another, there is a marked agglomeration of carbon black particles into larger masses. The suspending gases containing these larger agglomerates are immediately passed via conduit 16 into the cyclone separator 17 in which the enlarged agglomerates are relatively easily recovered. The recovered black is withdrawn via conduit 18 and passed to storage or to run storage prior to pelleting or packaging, as desired.

Conduits 10 and 11 are illustrated in Figure 1 as being of the same diameter so that approximately equal volumes of furnace effluent may be electrostatically treated in the vessels 30 and 31. However, under certain conditions it may be desirable to divert only a minor portion of the stream from conduit 8 through conduit 11. To control the flow of furnace effluent into vessel 31, a damper or butterfly type valve 42 is provided in conduit 11. At times when a small fraction of the furnace effluent is passed through conduit 11 into vessel 31, the electrodes 37 are charged by a higher potential so as to impart a greater electrostatic charge to the carbon black. The charge of opposite sign imparted to the stream of larger volume in vessel 30 is of lesser intensity. Upon mixing a small stream of highly charged particles with a large stream of particles having smaller and opposite charges, larger agglomerates are formed than when the particles of the two streams carry equal (but opposite) charges. Valve 43 is provided in conduit 21 for regulating the volume of gas stream flowing through conduit 21.

Hoppers terminating in conduits 39 and 38 (Figure 1) are provided for vessels 30 and 31, respectively, for removal of carbon black in case that some carbon black adheres to the electrodes and falls.

When recovery of carbon black in separator 17 is not complete, a second stage of treatment and separation may be used. The operation of this second stage may be exactly like that of the first stage, or the different portions of the gas stream may be treated in vessels 32 and 33 to different electrostatic conditions.

This second stage apparatus may be similar to the first stage apparatus. Vessels 32, 33 and 27 are provided with hopper bottoms terminating in conduits 93, 94 and 28. Vessels 32, 33, and conduits 24, 25 and 26 are insulated with a ceramic material 91, 91A, 92, and 92A, as shown.

In another embodiment, Figure 3, of my invention, in place of the rods, tubes, wires or bars 35 shown in Figure 2, are metal points termed leakage points. These may be used to expedite flow of electrostatic charge from a conductor to the stream of gas containing carbon black in suspension. In this embodiment a vessel 79 is lined with a ceramic insulator material 80 to eliminate short circuiting. A source of electric current 71 supplies current to the primary side of a transformer 73. One secondary connection 75 is grounded while the other is connected with a rectifier 76 for producing a rectified current. The rectifier in turn is connected to a lead 77 for passage of high voltage current via leads 77A to the leakage points 78. For example, when lead 77 is connected to the negative terminal of the rectifier 76, the points 78 become negatively charged and this charge drains or leaks off into the moving stream of furnace gases with suspended carbon black. This apparatus of Figure 3 may replace the apparatus having rods or wires in, for example, vessel 30 of Figure 1. Another apparatus similar to that of Figure 3 but so designed as to provide a charge of the opposite polarity, is provided to replace vessel 31 of Figure 1. In this manner, carbon black passing through one vessel provided with leakage points will become positively charged while carbon black passing through the other vessel provided with leakage points will become negatively charged. Upon mixing of these streams of oppositely charged particles, agglomeration into larger masses occurs. Similarly, a small portion of the carbon black containing material may be negatively charged while a large portion may be positively charged, and upon mixing relatively large agglomerates are formed. Vessel 79 is also provided with a hopper shaped bottom with an outlet conduit 81 for withdrawal of carbon black which adheres to and drops from the leakage points 78. The amount of carbon black withdrawn through conduits 38, 39, 93, 94, or 81 is, however, relatively small since little agglomeration in gaseous suspension takes place under the influence of high voltage direct current.

Still another embodiment of my invention involves forcing a portion of the carbon black stream through nozzles charged with high voltage direct current. A set of nozzles may be provided with a charge of polarity opposite from that which furnace carbon black possesses naturally. In this case agglomeration occurs upon mixing of the nozzle discharge with the main body of black. This embodiment is illustrated in Figure 4 in which a main conduit 104 carried cooled furnace effluent with carbon black in suspension. A portion of the stream is withdrawn through a side conduit 103 and injected by a blower 105 through charged nozzles 108 into the main body of black. By providing nozzles 108 with sharp outlet edges greater electrostatic charges are acquired by materials passing therethrough. The electrical apparatus 110 for producing direct current charge for the nozzles 108 may be the same as that illustrated in Figure 2.

The conduit 104 of Figure 4 is provided with a ceramic liner 102 while the conducting material from which the nozzles are made is insulated from the steel shell 101 by a ceramic insulator 107. An electrical lead 111 conducts the charge from apparatus 110 to a contact point 109 near the outer extremity of the nozzle element. A conduit 106 leading from blower 105 to the nozzle element is insulated therefrom by insulation 112.

When, for example, carbon black as produced acquires a positive charge, the apparatus of Figure 4 may be used to charge negatively a portion of the stream to promote agglomeration. Conversely, a carbon black as produced and acquiring a negative charge may be agglomerated by injecting through a positively charged nozzle into the remaining portion of the carbon black containing steam. In addition, carbon black, produced and not acquiring a charge naturally, may be agglomerated by electrostatic induction by withdrawing a portion of the stream and injecting the withdrawn portion into the parent stream through an electrostatically charged nozzle whereby the carbon black particles passing through the nozzle acquire a charge of the same sign as that of the nozzle. When these charged carbon black particles approach carbon black particles of the parent stream, charges of opposite sign are induced onto these latter carbon particles. Following this induction operation agglomeration occurs when particles having a charge of one sign attract and contact particles having a charge of the opposite sign.

While agglomeration of carbon black may be carried out using the apparatus of Figure 4, the apparatus illustrated in Figures 2 and 3 may also be used for charging one stream of black prior to its reintroduction into the main stream. Thus, the apparatus of Figure 2 as well as that of Figure 3 may be used for agglomeration of black by electrostatic induction as well as the apparatus of Figure 4.

In the operational steps hereinbefore explained direct current is used for imparting positive charge to carbon black or for imparting negative charge to another body of gas containing carbon black in suspension. Under certain conditions alternating current of high potential can be used. In the case of the utilization of alternating current, one charging vessel, for example, the vessel illustrated in Figure 2 or 3, is used. In this case the electrical system supplies alternating current of high potential but of relatively low frequency. For example a frequency of 10 to 30 cycles per second is satisfactory. In this embodiment the carbon black containing gases are passed through the charging vessel at a relatively rapid rate so that carbon black particles in the vicinity of the electrodes 35, 37, 40 or 41 receive a charge of one sign. This charged black passes on and the oncoming black receives a charge of the opposite sign, and so on. The bodies of oppositely charged black become mixed on continuing flow downstream of the electrode containing vessel and agglomeration occurs. To utilize more advantageously alternating current for the coagulation of finely divided carbon black I employ the apparatus embodiment illustrated in Figure 5.

In the embodiment wherein a stream of gas containing carbon black in suspension is passed at a high velocity through a conduit of insulating material and discharged into another stream of black, the apparatus illustrated in Figure 4 with several changes may be used. A switch 115 is inserted in electrical lead line 111. This switch is opened when using this embodiment of my invention. The conduit which terminates in nozzle 108 has about the same diameter as the nozzle and is made of insulating material so that as the stream of carbon black passes therethrough at a high velocity, the carbon black particles acquire a positive charge by friction. This frictionally charged stream is then injected into another and uncharged stream whereby the particles of the uncharged stream are charged oppositely to that of the incoming stream by electrostatic induction. Following this induction operation agglomeration occurs and the combined stream is passed to a cyclonic separator for carbon black recovery. The insulating material of which the conduit is made is such material as a ceramic material, glazed ceramic material or such electrically insulating material as will withstand the temperature of the environment in which the material is used.

In the embodiment of apparatus illustrated in Figure 5, a conduit 121 leads carbon black containing gases from their production furnaces and coolers. The stream is split into two portions, of substantially equal volumes, one portion passing through conduit 122 and the other through conduit 123. A vessel 124 is connected with conduits 122 and 126, while vessel 125 is connected with conduits 123 and 127. Conduits 126 and 127 converge into conduit 128, which is also connected to a centrifugal separator 129. Conduits 130 and 131 carry off gases and precipitated carbon black, respectively, from the separator 129.

Vessels 124 and 125, and the conduits leading into and out of these vessels including conduit 128, are lined with insulating refractory lining material 140. This lining material is a thermal as well as an electrical insulator.

Electric current from a source, not shown, is passed through electrical conduits 132 to a step-up transformer 133. One lead 134 from the secondary winding of this transformer is connected with electrodes 135 in vessel 124 while the other lead 136 is connected with electrodes 137 in vessel 125. These electrodes 135 and 137 are of course insulated, electrically, from the steel shells of vessels 124 and 125, in case the refractory material 140 is enclosed within steel. Under some conditions it may be preferable to construct vessels 124 and 125 and the conduits leading to and from these vessels in such a manner that steel shells need not be used for support.

Hoppers terminating in conduits 138 and 139 are provided for vessels 124 and 125, respectively, for removal of carbon black in case that some carbon black adheres to the electrodes and drops therefrom.

In the operation of the embodiment of apparatus of Figure 5, it is intended that when the portion of carbon black containing gases in contact with for example, the electrodes 135 in vessel 124 is exposed to a positive electrostatic charge, the portion of the carbon black containing gases in contact with the electrodes 137 in vessel 125 is contacted with a negative electrostatic charge. At any one instant the streams of carbon black are being exposed to opposite charges. Alternations merely change the sign of the charges in the vessels. Thus when electrodes 135 are imparting positive charges to the carbon black in their immediate vicinity, electrodes 137 are imparting negative charges to the black in vessel 137 and when the current is reversed the sign of the charges imparted by electrodes 135 and by electrodes 137 change.

The passage of the parallel streams of suspended carbon black in carbon black production furnace effluent gas through vessels 124 and 125 subjects successive portions of each stream to high potential electrostatic fields of alternately positive and negative signs.

When the streams of oppositely charged carbon black particles converge and flow into conduit 128, neutralization occurs accompanied by coagulation of carbon black as explained in reference to Figure 1.

The transformer 133 may be any desired type of transformer suitable to transform available alternating current to alternating current of 5,000 to 60,000 volts or more.

Under some conditions it is desirable to employ potentials as high as 100,000 volts at the electrodes.

One advantage, which is an important advantage, for using alternating current is that rectifiers need not be used. This savings is appreciable both for capital investment and maintenance as well as for operation.

Referring to the embodiment of apparatus illustrated in Figure 4, the source of electrical current 110 may be a source of low frequency alternating current. In this case the stream of gases containing carbon black in suspension issuing from the nozzles is exposed to alternately positive and negative charges. When this small stream is mixed with the main stream in conduit 104 coagulation of carbon black occurs. This so-treated stream is then passed to a cyclonic separation step for recovery of the black.

In case the carbon black containing gases are to be divided into two streams of unequal and constant volumes, the apparatus illustrated in Figure 6 may be used in place of the conduits 10, 11 and damper valve 42 of Figure 1. In the embodiment of Figure 6 the stream to be treated flows through conduit 151, is divided into two portions, one flowing via conduit 152 and the other via conduit 153. The volumes of the divided streams are proportional to the respective cross sections of the conduits 152 and 153. When using this system the ratio of split is constant. The use of the damper 42 with conduits 10 and 11, and 43 with conduits 20 and 21 of about equal diameters, makes possible adjustment of the ratio of volumes passing through the respective pairs of conduits.

While I have shown and described vessels 30, 31, 32, 33, and 79, and conduits 14, 15, 16, 24, 25, 26 and 104 as being steel shells having liners of a ceramic material, it is preferable not to use steel shells surrounding these vessels and conduits but to construct these vessels and conduits of ceramic material so as to avoid undesirable electrical effects.

While I have described my invention as being applied to the separation of carbon black from a suspending gas, it is not intended to be limited thereto since it is useful for separating industrial dusts from air or even atmospheric dust from air.

While certain embodiments of the invention have been described for illustrative purposes, the invention obviously is not limited thereto.

I claim:

1. A process for agglomerating carbon black comprising dividing a suspension of carbon black particles in a gas into two portions, electrostatically charging the carbon black particles of only one portion, combining the charged portion with the portion to which no charge is added and recovering only the carbon black from the recombined stream.

2. In the process of claim 1, recovering carbon black from the combined stream by cyclonic separation.

3. The process of claim 1 wherein the two portions are of unequal volumes and charging the portion of smaller volume.

4. An apparatus for agglomerating carbon black comprising, in combination, a vessel, a lining of ceramic electrical insulating material on the walls of said vessel, an inlet conduit to said vessel, an outlet conduit from said vessel, a lining of ceramic electrical insulating material around the inner walls of said outlet conduit, an electrical conductor extending through the wall of said vessel and being adapted to provide an electrostatic field of only one polarity with respect to the ground in said vessel, and through said lining, a discharge electrode only in said vessel, said discharge electrode being in electrical contact with said conductor, said conductor and said discharge electrode a source of high potential electric current of said one polarity connected with said electrical conductor.

5. In the apparatus of claim 4 wherein said electrical conductor is a plurality of conductors connected in parallel with said source and said discharge electrode is a plurality of discharge electrodes, each discharge electrode of said plurality of discharge electrodes being connected to a separate conductor of said plurality of conductors.

6. In the apparatus of claim 5 wherein said plurality of conductors are rods.

7. In the apparatus of claim 5 wherein said plurality of conductors are tubes.

8. In the apparatus of claim 5 wherein said plurality of conductors are in the form of leakage points.

9. In the apparatus of claim 5 wherein said plurality of conductors are conduit nozzles.

10. A process for agglomerating carbon black comprising providing at least two streams of carbon black particles suspended in gas, said carbon black particles being electrically neutral, frictionally charging with a positive charge the carbon black particles of one stream by injecting said one stream at high velocity through at least one nozzle into the stream whereby the carbon black particles in said other stream are charged oppositely to that of the stream being injected by electrostatic induction thereby forming agglomerates of carbon black, and separating the so formed carbon black agglomerates.

11. In the process of claim 10, recovering the carbon black from the combined stream by cyclonic separation.

References Cited in the file of this patent

UNITED STATES PATENTS

| | | |
|---|---|---|
| 1,130,213 | Steere | Mar. 2, 1915 |
| 1,787,955 | Rosecrans | Jan. 6, 1931 |
| 1,853,393 | Anderson | Apr. 12, 1932 |
| 2,318,093 | Penney | May 4, 1943 |
| 2,351,089 | Abbey | June 13, 1944 |
| 2,368,828 | Hanson | Feb. 6, 1945 |
| 2,593,251 | Bonacci | Apr. 15, 1952 |

FOREIGN PATENTS

| | | |
|---|---|---|
| 183,768 | Great Britain | Aug. 3, 1922 |
| 227,022 | Great Britain | Jan. 8, 1925 |

UNITED STATES PATENT OFFICE

CERTIFICATE OF CORRECTION

Patent No. 2,758,666                                August 14, 1956

Spencer S. Prentiss

It is hereby certified that error appears in the printed specification of the above numbered patent requiring correction and that the said Letters Patent should read as corrected below.

Column 8, lines 3 to 16, inclusive, which comprises the entire subject matter of claim 4, should read as shown below instead of as in the patent:

4. An apparatus for agglomerating carbon black comprising, in combination, a vessel, a lining of ceramic electrical insulating material on the walls of said vessel, an inlet conduit to said vessel, an outlet conduit from said vessel, a lining of ceramic electrical insulating material around the inner walls of said outlet conduit, an electrical conductor extending through the wall of said vessel and through said lining, a discharge electrode only in said vessel, said discharge electrode being in electrical contact with said conductor, said conductor and said discharge electrode being adapted to provide an electrostatic field of only one polarity with respect to the ground in said vessel, and a source of high potential electric current of said one polarity connected with said electrical conductor.

Signed and sealed this 19th day of August 1958.

(SEAL)

Attest:

KARL H. AXLINE
Attesting Officer

ROBERT C. WATSON
Commissioner of Patents